United States Patent
Zhang et al.

(10) Patent No.: US 12,286,494 B2
(45) Date of Patent: Apr. 29, 2025

(54) CHROMOGENIC DOUBLE INVERSE OPALS PHOTONIC CRYSTAL RESIN FILM USING WATER AS INK AND THE PREPARATION THEREOF

(71) Applicant: Dalian University of Technology, Liaoning (CN)

(72) Inventors: Shufen Zhang, Liaoning (CN); Changtong Zhou, Liaoning (CN); Wenbin Niu, Liaoning (CN); Wei Ma, Liaoning (CN); Bingtao Tang, Liaoning (CN); Suli Wu, Liaoning (CN)

(73) Assignee: DALIAN UNIVERSITY OF TECHNOLOGY, Liaoning (CN)

(*) Notice: Subject to any disclaimer, the term of this patent is extended or adjusted under 35 U.S.C. 154(b) by 421 days.

(21) Appl. No.: 17/938,110

(22) Filed: Oct. 5, 2022

(65) Prior Publication Data
US 2023/0183407 A1    Jun. 15, 2023

(30) Foreign Application Priority Data
Dec. 14, 2021  (CN) .......................... 202111532167.9

(51) Int. Cl.
C08F 222/10  (2006.01)

(52) U.S. Cl.
CPC ............................ C08F 222/1063 (2020.02)

(58) Field of Classification Search
CPC ................................................. C08F 222/1063
(Continued)

(56) References Cited

U.S. PATENT DOCUMENTS

| | | | |
|---|---|---|---|
| 2020/0190704 A1* | 6/2020 | Zhang | G02B 6/02295 |
| 2023/0003993 A1* | 1/2023 | Zhang | C08J 5/18 |

FOREIGN PATENT DOCUMENTS

| | | | | |
|---|---|---|---|---|
| CN | 111966595 A | * | 11/2020 | G06F 11/362 |
| CN | 112225856 A | * | 1/2021 | B01D 15/08 |
| CN | 113278176 A | * | 8/2021 | C08J 5/18 |

OTHER PUBLICATIONS

Aryal et al. "Complete and robust bandgap switching in double-inverse-opal photonic crystal", Applied Physics Letter, 92, 011109 (2008). (Year: 2008).*
(Continued)

*Primary Examiner* — Michael M. Bernshteyn
(74) *Attorney, Agent, or Firm* — NKL Law; Allen Xue (57) ABSTRACT

A double-inverse opal photonic crystal resin film is formed by embedding nanospheres in pores of polyacrylate inverse opal framework material and then filling the pores of the double-inverse opal photonic crystal resin film with an ethanol solution with hydrophilic acrylamide dissolved therein followed by photopolymerization to form a polyacrylamide network, so as to obtain the double-inverse opal photonic crystal resin film using water as ink. A mass fraction of hydrophilic acrylamide in the ethanol solution is 2 to 8 wt. %. The resin film can induce water to penetrate into the pores of the double-inverse opal photonic crystal resin film, making the nanospheres in the pores of the inverse opal framework distribute from random to order under the action of buoyancy force, thereby eliminating scattering interference and producing brilliant structural colors by regulating refractive index contrast.

10 Claims, 7 Drawing Sheets

(58) Field of Classification Search
USPC .......................................................... 523/201
See application file for complete search history.

(56) References Cited

OTHER PUBLICATIONS

Ruhl et al. "Double-Inverse-Opal Photonic Crystal: The Route to Photonic Bandgap Switching", Advanced Functional Materials, 2006, 16, pp. 885-890 (Year: 2006).*

Yu et al. "Large-Area and Water Rewritable Photonic Crystal Films Obtained by the Thermal Assisted Air-Liquid Interface Self Assembly", ACS Applied Materials, 2019, 11, pp. 22777-22785. (Year: 2019).*

Xi, Guan et al.; "Water assisted biomimetic synergistic process and its application in water-jet rewritable paper"; Nature Communications; vol. 9: 4819; 2018; pp. 1-9.

Du, Xuemin et al.; "Water as a colorful ink: transparent, rewritable photonic coatings based on colloidal crystals embedded in chitosan hydrogel"; Journal of Materials Chemistry C; vol. 00, No. 1-3; 2012; pp. 1-6.

Xia, Yongqing et al.; "Tough, Freestanding, and Colorless Photonic Paper Using Water as Ink"; Advanced Materials Interfaces; vol. 1901363; 2019; pp. 1-7.

Yu, Shuzhen et al.; "Large-Area and Water Rewriteable Photonic Crystal Films Obtained by the Thermal Assisted Air-Liquid Interface Self Assembly"; ACS Applied Materials & interfaces; vol. 11; Jun. 5, 2019; pp. 22777-22785.

Zhou, Changtong et al.; "Fast Water-response Double-inverse Opal Films with Brilliant Structural Color"; Chemical Engineering Journal; vol. 426, No. 131213; 2021; pp. 1-10.

* cited by examiner

Bending

CHROMOGENIC DOUBLE INVERSE OPALS PHOTONIC CRYSTAL RESIN FILM USING WATER AS INK AND THE PREPARATION THEREOF

TECHNICAL FIELD

The present disclosure relates to the field of structural color materials, in particular to a chromogenic double-inverse opal photonic crystal resin film using water as ink and a preparation method thereof, belonging to a responsive photonic crystal and a preparation method thereof.

BACKGROUND

As an important medium for storage and dissemination of information, paper has greatly promoted the development and progress of human civilization. Although the world today is dominated by electronic products and all kinds of information are recorded and transmitted rapidly in digital form, paper still plays a vital role in cultural inheritance and social and economic growth. However, excessive production and use of traditional paper consume a lot of natural resources, which brings serious environmental problems to our society and has drawn great attention from people in recent years. Therefore, it is a pressing task to develop environmentally friendly and low consuming functional materials to achieve a perfect balance between environmental protection and economic development and meet the sustainable development of society.

Compared with traditional paper, rewritable water-responsive photonic paper, as an eco-friendly and low resource-consuming information storage carrier, provides a potential possibility for promoting the sustainable development of society. Zhang Xiaoan et al. developed the inkless water-jet printing technology by introducing a bimolecular water synergistic chromotropic system composed of chromotropic dye and developer into the paper, using the principles that the dye and the developer do not develop color before meeting water and display color after meeting water (Patent applications of CN108873547A, CN108873546A and CN108873545A, and Nat.commun. 2018, 9, 4819-4827). This technology still relies on dyes for color developing. Therefore, the development of non-dye-based chromogenic materials with simple and easy color adjustment has become a research hotspot.

Photonic crystal is a material formed by two substances having different refractive indexes which are periodically arranged in space. This regular and orderly structural feature enables photonic crystal to modulate the light propagation. The photonic band gap selectively prohibits the light having a specific wavelength from passing through so that obtains the structural color. Structural color materials can obtain a variety of colors by adjusting and controlling the size of the used colloidal microspheres, which have been widely concerned by researchers. Photonic crystal based chromogenic materials using water as ink make use of the swelling behavior of hydrogel matrix to obtain colors by adjusting periodic lattice constant (J. mater. chem. C, 2015, 3, 3542-3547; Adv. Mater. Interfaces 2019, 6, 1901363-1901369.), or take the soft colloidal nanospheres as building unit to realize the water-writing process by changing the refractive index contrast (ACS Appl. Mater. Interfaces, 2019, 11, 22777-22785). Or, the chromogenic materials using water as ink are double-inverse photonic crystal resin film based on hydrogen bond deprotonation to induce wettability change to realize color developing (Chem. Eng. J. 2021, 426, 131213-131222.). However, it takes a certain amount of time for the swelling of the hydrogel system and the chromogenic process of the soft colloidal particles changing the refractive index in the presence of water. The dependence of hydrogel material on the water environment and the size of prepared double-inverse opal photonic crystal resin film limits the chromogenic materials' potential practical application to a certain extent. Therefore, it has become the mainstream research direction recently to realize color development using water as ink through non-colloidal array mode by means of developing new photonic materials with simple preparation technology and easy color adjustment.

SUMMARY OF THE INVENTION

It is an object of the present invention to provide a chromogenic double-inverse opal photonic crystal resin film using water as ink and a preparation method thereof. The present invention takes the hydrophilic double-inverse opal photonic crystal resin film as construction unit to prepare a chromogenic polyacrylate-based double-inverse opal photonic crystal resin film using water as ink. The resin film provided by the present invention uses water as chromogenic pigment and is easy to write. By adjusting particle size of the used colloidal nanospheres, papers of various colors using water as ink can be easily obtained. Retention time of structural color can be adjusted by writing with a mixture of ethylene glycol and water in different proportions. The double-inverse opal photonic crystal resin film prepared by the present invention has good flexibility and structural stability. The double-inverse opal photonic crystal resin film can be written with water and erased many times, having good recyclability. The double-inverse opal photonic crystal resin film has low cost and good universality, which is of great significance to promote the practical application of structural color materials. As an environment-friendly and low resource consumed information storage material and communication carrier, the double-inverse opal photonic crystal resin film has great application value and provides a potential possibility for promoting the sustainable development of society.

A chromogenic double-inverse opal photonic crystal resin film using water as ink includes a polyacrylamide or polydiacetone acrylamide network structure. The polyacrylamide or polydiacetone acrylamide network structure is formed by embedding nanospheres in pores of a polyacrylate inverse opal framework material to obtain a double-inverse opal photonic crystal resin film and then filling the pores of the double-inverse opal photonic crystal resin film with an ethanol solution with hydrophilic acrylamide or diacetone acrylamide dissolved therein followed by photopolymerization, wherein a mass fraction of hydrophilic acrylamide or diacetone acrylamide in the ethanol solution is 2 to 8 wt. %.

The nanosphere is selected from one of polystyrene, polymethylmethacrylate, poly(styrene-methyl methacrylate-acrylic acid), titanium dioxide, cadmium sulfide, zinc oxide, and zinc sulfide.

In some embodiments, a preferable diameter of the nanosphere is 165 to 230 nm, and a preferable aperture of the polyacrylate inverse opal framework material is 185 to 280 nm.

In some embodiments, a preferable diameter of the nanosphere is 165 to 230 nm, a preferable particle size distribution of the nanospheres is 0.02 to 0.07, and a preferable surface potential is −50 to −35 mV.

In some embodiments, preferably, the photoinitiator for the photopolymerization to form the polyacrylamide network is 2-hydroxy-2-methyl-1-phenyl-1-acetone (1173) or 2,2-dimethoxy-2-phenylacetophenone. The conditions for photopolymerization are of ultraviolet photopolymerization for 3 to 20 minutes with a power of 0.5 to 2 kW.

In some embodiments, preferably, the polyacrylate inverse opal framework material is formed by photopolymerization of triacrylates, diacrylates and acrylic acid as monomer components, wherein a volume ratio of triacrylates, diacrylates and acrylic acid is 1:4:0.5 to 1:4:2. The photoinitiator for photopolymerization is 2-hydroxy-2-methyl-1-phenyl-1-acetone (1173) or 2,2-dimethoxy-2-phenylacetophenone. An amount of the photoinitiator accounts for 1 to 6% of a total volume of the triacrylates, diacrylates and acrylic acid. Preferably, the conditions for photopolymerization are of ultraviolet photopolymerization for 30 to 60 seconds with a power of 0.5 to2 kW.

In some embodiments, preferably, the triacrylates is one of ethoxylated trimethylolpropane triacrylates.

In some embodiments, preferably, the diacrylates is poly(ethylene glycol) diacrylates, including one or two of poly(ethylene glycol) (200) diacrylate, poly(ethylene glycol) (250) diacrylate, poly(ethylene glycol) (400) diacrylate, and poly(ethylene glycol) (600) diacrylate.

The present disclosure provides a chromogenic double-inverse opal crystal resin film using water as ink, and the polyacrylamide network structure thereof has strong hydrophilicity (contact angle <30°) and can induce water to quickly (<1 second) penetrate into the pores of the double-inverse opal photonic crystal resin film.

The present disclosure also provides a method for preparing the above disclosed chromogenic double-inverse opal photonic crystal resin film using water as ink, including following steps of:

S1. coating a prepared core-shell nanosphere concentrate with a mass fraction of 20-40 wt. % on a glass or stainless-steel substrate with a rod, self-assembling the core-shell nanospheres to form an opal photonic crystal template followed by placing the obtained opal photonic crystal template in an oven at 80 to 95° C. for 0.5 to 2 hours to improve its structural stability;

S2. respectively affixing polyimide tape at four corners of the opal photonic crystal template as gaskets, and covering a glass sheet thereon to form a gap with a width of 500 to 1000 μm; filling the gap with a mixture liquor of triacrylates, diacrylates, acrylic acid and a photoinitiator to conduct a photopolymerizing under ultraviolet for 30 to 60 seconds with a power of 0.5 to 2 kW to form a polyacrylate resin composite film;

S3. etching the shell with hydrofluoric acid with a mass fraction of 1 to 10 wt. % to obtain the polyacrylate double-inverse opal photonic crystal resin film;

S4. filling the holes of the polyacrylate double-inverse opal photonic crystal resin film with the ethanol solution with hydrophilic acrylamide or diacetone acrylamide dissolved therein (a mass fraction of 2 to 8 wt. %) to conduct a photopolymerization under ultraviolet for 3 to 20 minutes with a power of 0.5 to 2 kW to form a polyacrylamide or polydiacetone acrylamide network structure, so as to obtain a chromogenic double-inverse opal photonic crystal resin film using water as ink.

The ethanol solution with hydrophilic acrylamide or diacetone acrylamide dissolved therein is prepared from hydrophilic acrylamide or diacetone acrylamide, a cross-linking agent, a photoinitiator and ethanol. The mass ratio of acrylamide or diacetone acrylamide to the crosslinking agent is 1:5 to 15, and the amount of the photoinitiator is 5 to 15% by mass of the acrylamide or diacetone acrylamide.

In some embodiments, preferably, in step S1, the core-shell nanosphere is selected from one of polystyrene coated with silicon dioxide, polymethylmethacrylate coated with silicon dioxide, poly (styrene-methyl methacrylate-acrylic acid) coated with silicon dioxide, titanium dioxide coated with silicon dioxide, cadmium sulfide coated with silicon dioxide, zinc oxide coated with silicon dioxide, and zinc sulfide coated with silicon dioxide.

In some embodiments, preferably, in step S1, the particle size of the core-shell nanosphere is 165 to 230 nm, a PDI for the particle size distribution of the nanospheres is 0.02 to 0.06, and a surface potential is −45 to −50 mV The brilliant structural color displayed by the double-inverse opal photonic crystal resin film is determined by the size of the core nanosphere and the thickness of the shell of the core-shell nanosphere. The size of the core nanosphere is set as X, and the thickness of the shell is set as Y. When $165<X\leq175$ nm and $10<Y\leq20$ nm, the chromogenic color using water as ink is blue; when $180<X\leq190$ nm and $15<Y\leq20$ nm, the chromogenic color using water as ink is green; and when $220<X\leq230$ nm and $15<Y\leq25$ nm, the chromogenic color using water as ink is red.

In some embodiments, preferably, in step S1, nanospheres of polystyrene, polymethylmethacrylate and poly(phenylethylene-methyl methacrylate-acrylic acid) are prepared by soap-free emulsion polymerization, and titanium dioxide, cadmium sulfide, zinc oxide and zinc sulfide nanospheres are prepared by hydrothermal method, and then the prepared nanospheres of polystyrene, polymethylmethacrylate, poly (phenylethylene-methyl methacrylate-acrylic acid), titanium dioxide, cadmium sulfide, zinc oxide and zinc sulfide are took as seed core to coat silicon dioxide shell on the surface thereon by hydrolyzing vinyl triethoxysilane, so as to form core-shell structure nanospheres of polystyrene coated with silicon dioxide, polymethylmethacrylate coated with silicon dioxide, poly(phenylethylene-methyl methacrylate-acrylic acid) coated with silicon dioxide, titanium dioxide coated with silicon dioxide, cadmium sulfide coated with silicon dioxide, zinc oxide coated with silicon dioxide, and zinc sulfide coated with silicon dioxide.

In some embodiments, preferably, in step S1, the core-shell nanosphere concentrate is prepared with ethanol.

In some embodiments, in step S1, a preferable coating amount of the core-shell nanosphere concentrate is 2.0~3.0 μL/cm².

In some embodiments, in step S2, a preferable area of the polyimide tape is 0.5 mm² and a preferable thickness of that is 500 to 1000 μm.

In some embodiments, preferably, in step S4, the cross-linking agent is N,N-methylenebisacrylamide or trimethylolpropane triacrylate.

In some embodiments, preferably, in step S4, the photoinitiator is 2-hydroxy-2-methyl-1-phenyl-1-acetone (1173) or 2,2-dimethoxy-2-phenylacetophenone.

In some embodiments, a preferable filling amount of the ethanol solution with hydrophilic acrylamide or diacetone acrylamide dissolved therein is 10-20 μL/cm².

The whole process is operated at room temperature. The preparation conditions of the present disclosure are mild without limiting the base material, having wide applicability.

Another object of the present disclosure is to provide an application of the chromogenic polyacrylate double-inverse opal photonic crystal resin film using water as ink. The resin film has a wide application prospect as paper using water as ink and materials for display, sensing and decorating. The hydrophilic polyacrylamide or polydiacetone acrylamide network structure can induce water to rapidly penetrate into the pores of inverse opal, making the nanospheres in the pores of inverse opal framework to distribute from random to order under the action of buoyancy force, thereby eliminating scattering interference and generating brilliant structural colors by regulating refractive index contrast, so that the resin film can be used as a chromogenic photonic paper using water as ink. The difference between this paper using water as ink and the reported photonic paper is that the prior art makes use of the swelling behavior of the hydrogel matrix to adjust the periodic lattice constant of photonic crystals, or makes use of soft colloidal particles as building unit to change the refractive index contrast. The response rate of the water-writing chromogenic obtained by lattice parameter changes is slow, and the hydrogel materials need to keep the water therein to maintain structural stability. The chromogenic double-inverse opal photonic crystal resin film using water as ink provided in the present disclosure as a water-writing paper has advantages that the colloidal lattice parameters are not changed and the refractive index contrast is regulated by inducing water to penetrate into the holes of the inverse opal so as to produce a brilliant structural color by a non-array adjustment mode.

Beneficial Effects of the Present Disclosure

The double-inverse opal photonic crystal resin film has the advantages of low cost and good universality. The prepared chromogenic polyacrylate based double-inverse opal photonic crystal resin film using water as ink has a fast water-writing chromogenic performance (<1 second). The double-inverse opal photonic crystal resin film has good structural stability and recyclability (can be recycled for more than 10000 times), avoiding environmental pollution caused by paper. Just using water as writing material, the paper has a fast speed of water color developing (<1.0 second) and a structural color as brilliant as metallic luster. As an environmentally-friendly and low resource-consuming information storage material and communication carrier, the double-inverse opal photonic crystal resin film of the present disclosure has great application value and is of great significance to promote the practical application of structural color materials, providing a potential possibility to promote the sustainable development of society.

DETAILED DESCRIPTION OF DRAWINGS

FIG. 2 shows the SEM images of the polystyrene nanospheres (FIG. 2a, 170 nm; FIG. 2b, 185 nm; and FIG. 2c, 225 nm) used in the present disclosure and the corresponding SEM images of the polystyrene coated with silicon dioxide nanospheres (FIG. 2d, 200 nm; FIG. 2e, 220 nm; and FIG. 2f, 265 nm). The polystyrene nanospheres (with a particle of 170 nm) in FIG. 2a and the polystyrene coated with silicon dioxide nanospheres (with a particle of 200 nm) in FIG. 2d are prepared in Embodiment 3. The polystyrene nanospheres (with a particle of 185 nm) in FIG. 2b and the polystyrene coated with silicon dioxide nanospheres (with a particle of 220 nm) in FIG. 2e are prepared in Embodiment 2. The polystyrene nanospheres (with a particle of 225 nm) in FIG. 2c and the polystyrene coated with silicon dioxide nanospheres (with a particle of 265 nm) in FIG. 2f are prepared in Embodiment 1.

FIG. 4a is the contact angle of the chromogenic double-inverse opal photonic crystal resin film in Embodiment 3. FIG. 4b is the contact angle of the chromogenic double-inverse opal photonic crystal resin film in Embodiment 2. FIG. 4c is the contact angle of the chromogenic double-inverse opal photonic crystal resin film in Embodiment 1. As shown in the figure, the contact angles are all less than 30°, indicating that the surface of the prepared chromogenic double-inverse opal photonic crystal resin film has good hydrophilicity.

FIG. 7b refers to the green chromogenic double-inverse opal photonic crystal resin film using water as ink prepared in Embodiment 2. FIG. 7c refers to the red chromogenic double-inverse opal photonic crystal resin film using water as ink prepared in Embodiment 3). It can be seen from the reflection spectra that with increase of the observation angle, the structural color has an obvious blue shift, having a typical angle dependent characteristic of three-dimensional photonic crystal.

FIG. 8b shows the resin film after water drying.

FIG. 8c shows the number and English phrase written on the resin film with water). It shows that the prepared chromogenic double-inverse opal photonic crystal resin film using water as ink can be erased after writing with water and write again.

DETAILED DESCRIPTION OF PREFERRED EMBODIMENTS

The following non-limiting embodiments may enable those skilled in the art to understand the present disclosure more comprehensively, but do not limit the present disclosure in any way.

The test methods in the following embodiments are conventional methods unless otherwise specified. The reagents and materials are commercially obtained unless otherwise specified.

Embodiment 1

Polystyrene colloidal nanospheres were synthesized by emulsion polymerization. 0.55 g of sodium dodecyl sulfate emulsifier and 900 mL of deionized water were added into a 2000 mL three-necked round-bottomed flask with a mechanical stirrer, and were heated in oil bath to 85° C. to emulsify them for 1 hour with stirring at 350 r/min, followed by adding 90 g of styrene monomer into the flask to further stir for 30 minutes. 1 g of potassium persulfate initiator dissolved in 5 g of deionized water was added into the flask to react for 5 hours. After completion of the reaction, a white polystyrene nanospheres emulsion (with a particle size of 225 nm, a PDI of 0.062 and a surface potential of −49.2 mV) was obtained.

Core-shell nanospheres of polystyrene coated with silicon dioxide were prepared by modified Stöber method, i.e., by hydrolyzing vinyl triethoxylsilane in a polystyrene nanospheres emulsion, the polystyrene nanospheres were coated with a dense silicon dioxide shell layer on the surfaces. 30 mL of the polystyrene nanospheres emulsion was added into a 250 mL single-necked round-bottomed flask, 100 mL of deionized water and 15 mL of ammonia and a stir bar were added into the flask to uniformly disperse by ultrasonic. The flask was stirred at room temperature with a magnetic stirrer at 300 r/min, while 8 mL of vinyl triethoxysilane was dropwise added into the flask with a micro injection pump within 3 hours. After reaction for 18 hours, a dispersion liquid of core-shell nanospheres of polystyrene coated with silicon dioxide (with a particle size of 260 nm, a PDI of 0.022 and a surface potential of −49.6 mV) was obtained. The obtained nanospheres dispersion liquid was washed with absolute ethanol for 3 times, and was finally prepared into a 30 wt. % nanospheres concentrate with ethanol for standby.

Figure 1:
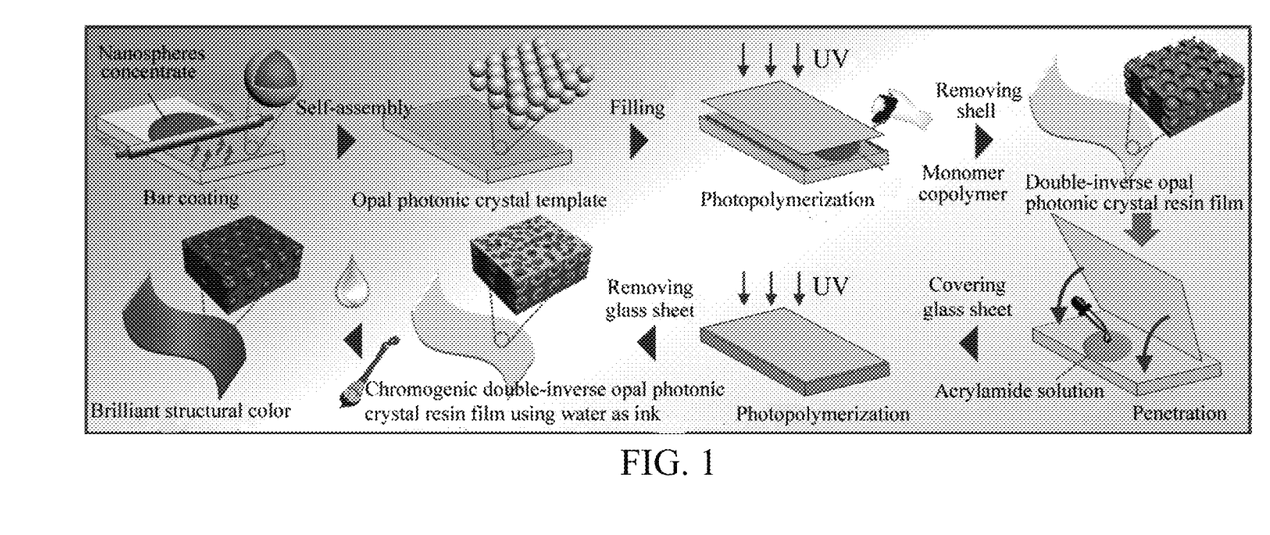
FIG. 1 shows a preparation flow diagram of the double-inverse opal photonic crystal resin film using water as ink.
Figure 2:
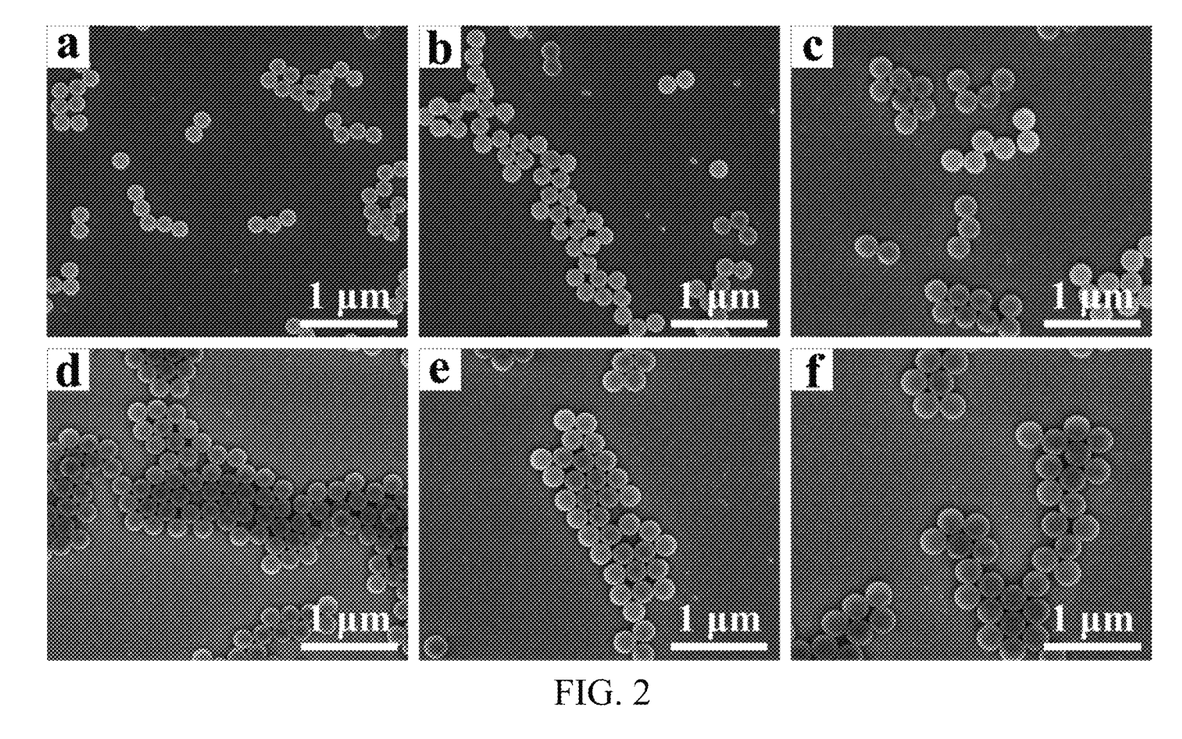
Figure 3:
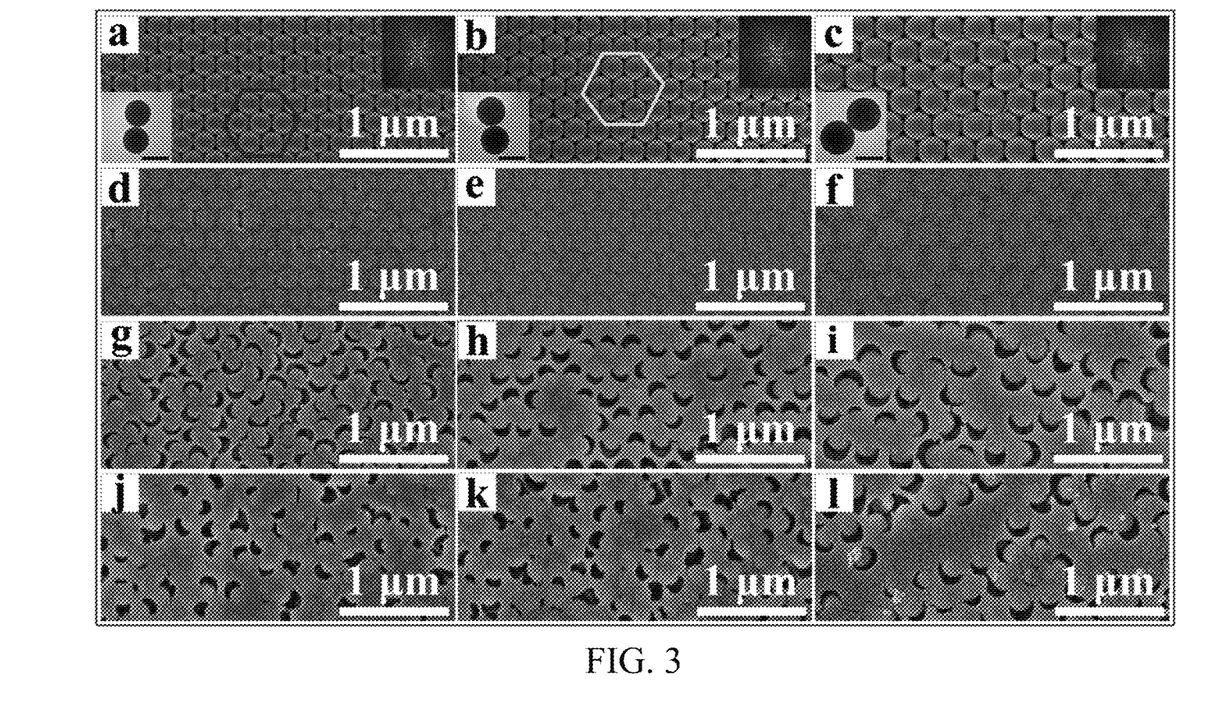
FIG. 3 shows the SEM top views of the polystyrene coated with silicon dioxide nanospheres, the composite film of the polystyrene coated with silicon dioxide nanospheres opal template, the double-inverse opal film, and the hydrophilic double-inverse opal film. The polystyrene coated with silicon dioxide nanospheres (with a particle size of 200 nm) in FIG. 3a, the composite film of the polystyrene coated with silicon dioxide nanospheres opal template in FIG. 3d, the double-inverse opal film in FIG. 3g, and the hydrophilic double-inverse opal film in FIG. 3j are prepared in Embodiment 3. The polystyrene coated with silicon dioxide nanospheres (with a particle size of 220 nm) in FIG. 3b, the composite film of the polystyrene coated with silicon dioxide nanospheres opal template in FIG. 3e, the double-inverse opal film in FIG. 3h, and the hydrophilic double-inverse opal film in FIG. 3k are prepared in Embodiment 2. The polystyrene coated with silicon dioxide nanospheres (with a particle size of 265 nm) in FIG. 3c, the composite film of the polystyrene coated with silicon dioxide nanospheres opal template in FIG. 3f, the double-inverse opal film in FIG. 3I, and the hydrophilic double-inverse opal film in FIG. 3l are prepared in Embodiment 1.
Figure 4:
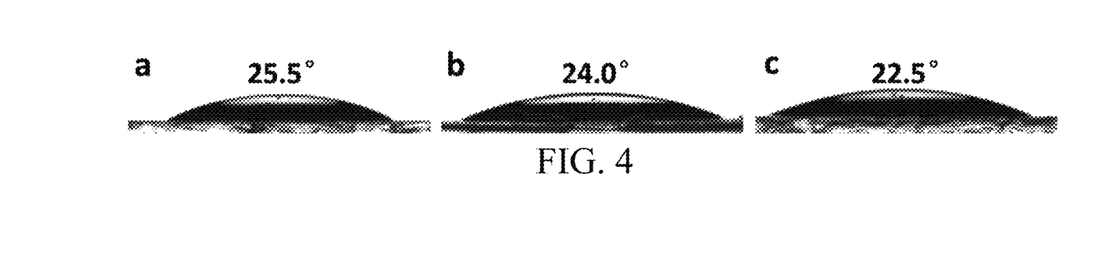
FIG. 4 shows the contact angles of the double-inverse opal photonic crystal resin film using water as ink.
Figure 5:
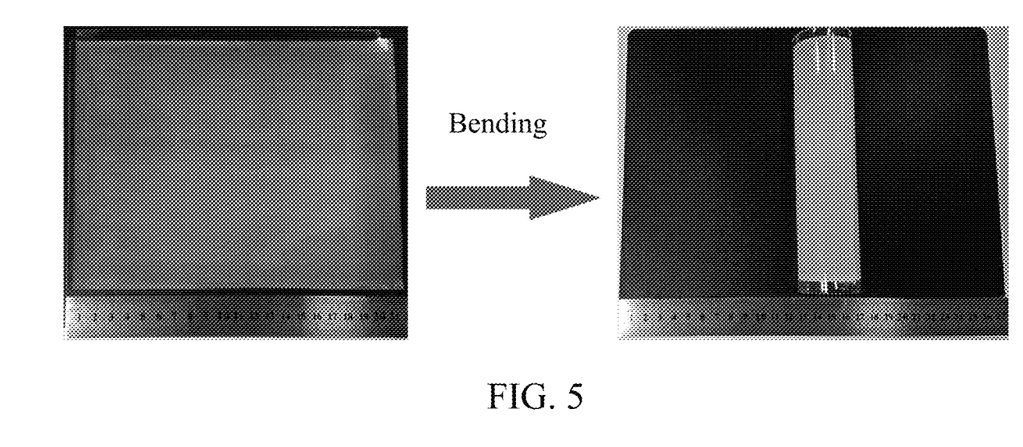
FIG. 5 shows the digital photos of the obtained blue chromogenic double-inverse opal photonic crystal resin film using water as ink in the dry state in Embodiment 1. It shows that the prepared chromogenic double-inverse opal photonic crystal resin film using water as ink has good flexibility.
Figure 6:
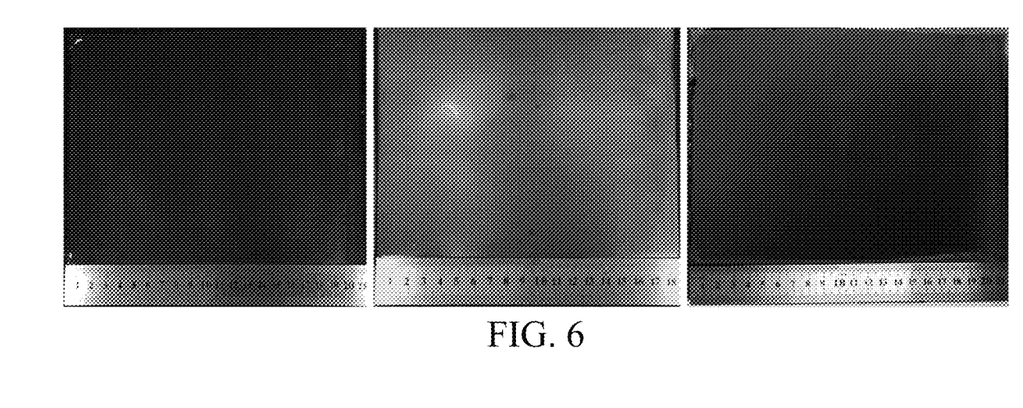
FIG. 6 shows, from left to right, the photos displaying structural colors of the chromogenic double-inverse opal photonic crystal resin film using water as ink obtained in Embodiments 1 to 3 after water infiltration. It can be seen that the prepared chromogenic double-inverse opal photonic crystal resin film using water as ink displays blue, green and red structural colors respectively from left to right.
Figure 7:
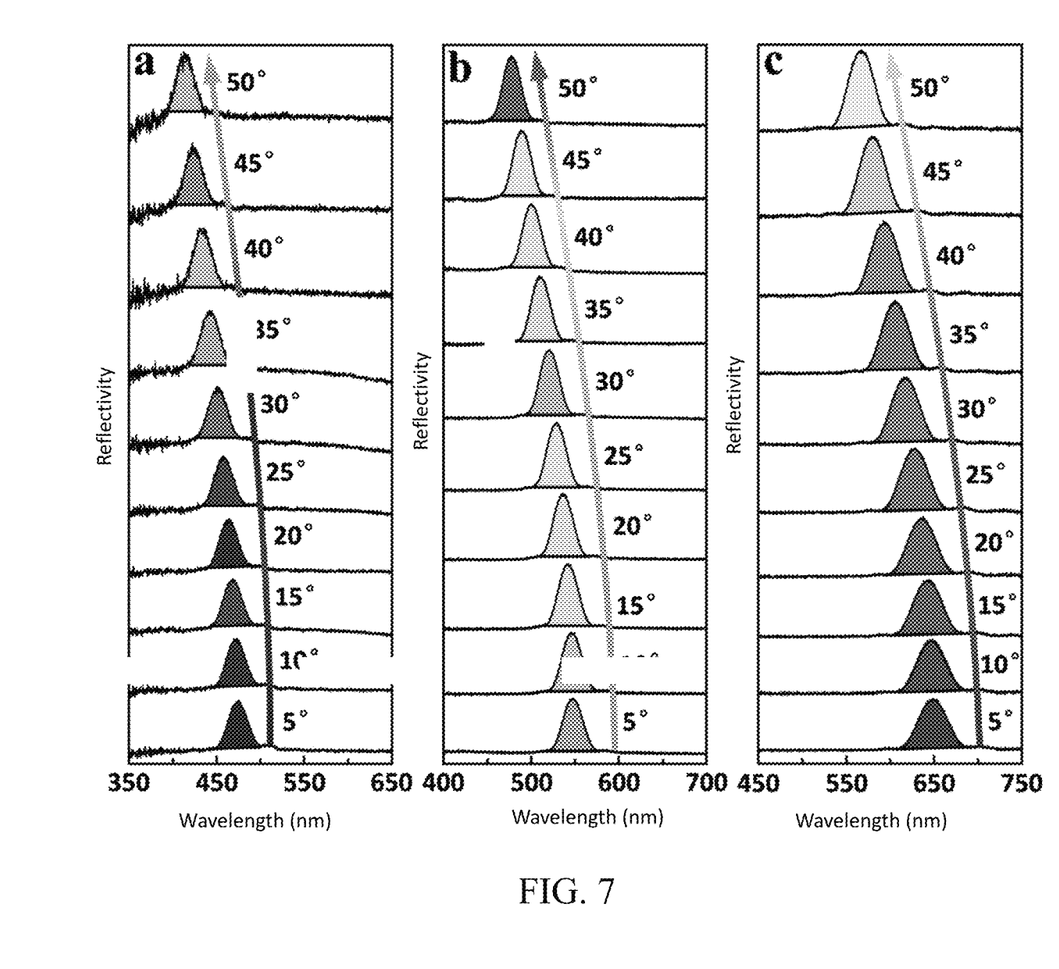
FIG. 7 shows the reflection spectra measured from different angles of the chromogenic double-inverse opal photonic crystal resin films using water as ink prepared in Embodiments 1 to 3 after water infiltration (FIG. 7a refers to the blue chromogenic double-inverse opal photonic crystal resin film using water as ink prepared in Embodiment 1.
Figure 8:
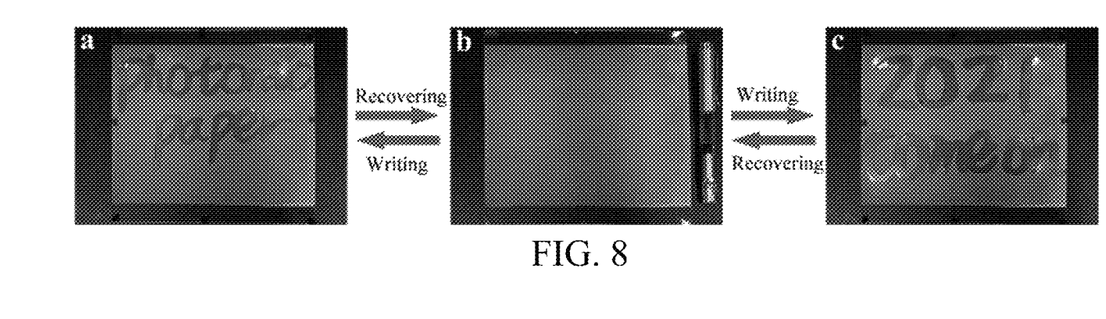
FIG. 8 shows the digital photos of the green chromogenic double-inverse opal photonic crystal resin film using water as ink before and after writing with water in Embodiment 2 (FIG. 8a shows the English words written on the resin film with water.
Figure 9:
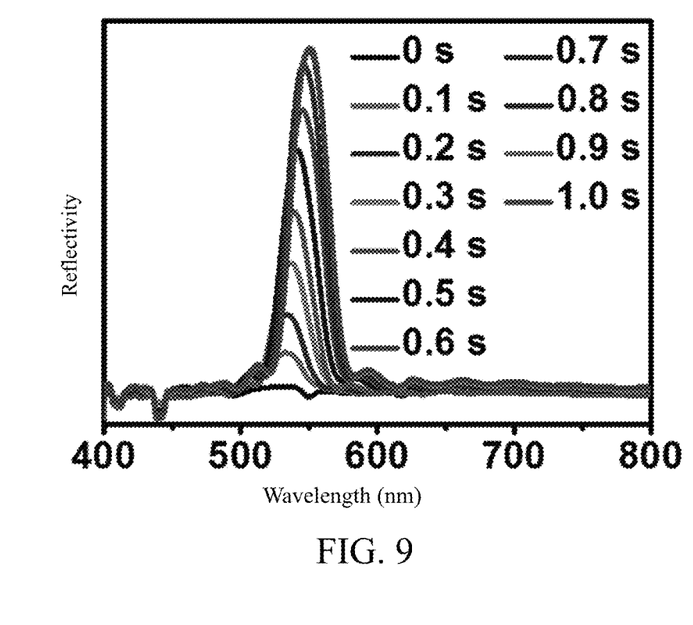
FIG. 9 shows the reflection spectrum measured at different times of the green chromogenic double-inverse opal photonic crystal resin film using water as ink after water infiltration in Embodiment 2. As shown in the figure, at about 0.8 second, the position and intensity of the reflection peak will not change, indicating that the balance state has been reached and showing that the prepared double-inverse opal photonic crystal resin film using water as ink has rapid water-writing chromogenic performance.
Figure 10:
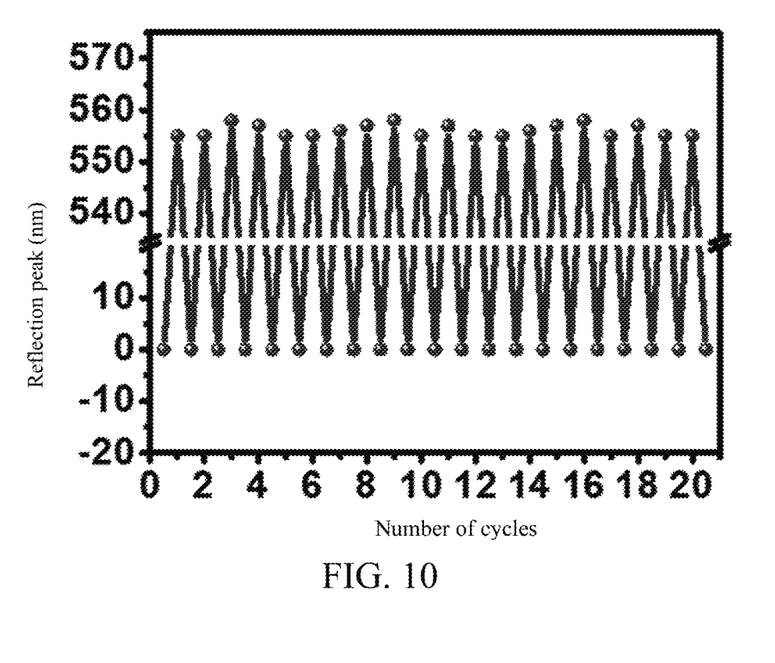
FIG. 10 shows the reflection spectrum of a circulating water-writing test of the green chromogenic double-inverse opal photonic crystal resin film using water as ink prepared in Embodiment 2. As shown in the figure, after 20 cycles of testing, the position of the reflection peak has hardly changed significantly, indicating that the chromogenic double-inverse opal photonic crystal resin film using water as ink has good cyclic reversibility.

Preparation flow of the chromogenic double-inverse opal photonic crystal resin film using water as ink is shown as FIG. 1, including the following steps:

S1. A nanospheres concentrate of polystyrene coated with silicon dioxide (a particle size of the core-shell nanosphere was 260 nm and a particle size of the internal polystyrene nanosphere was 225 nm) with a mass fraction of 30 wt. % was coated on a glass substrate (18 cm×22 cm) with a rod at room temperature. The coating amount of the nanospheres concentrate was 2.5 μL/cm$^2$. The nanospheres were self-assembled to obtain an opal photonic crystal template. The obtained opal photonic crystal template was placed in an oven at 90° C. for 1 hour.

S2. Polyimide tape was affixed at four corners of the opal photonic crystal template as a gasket and a glass sheet was covered thereon to form a gap with a width of 500 μm. Copolymer monomers of ethoxylated trimethylolpropane triacrylate, poly(ethylene glycol) (200) diacrylate and acrylic acid were mixed in a volume ratio of 1:4:0.5 followed by addition of a photoinitiator (2-hydroxy-2-methyl-1-phenyl-1-acetone (1173)), in which the volume ratio of the photoinitiator to the copolymer monomers was 0.05:1. After ultrasonic dispersion to mix evenly, the mixture was injected into the gap of the "sandwich" structure followed by photopolymerization under ultraviolet with a power of 1 kW for 40 seconds to obtain a flexible polyacrylate resin composite film.

S3. A polymer resin composite film containing polystyrene coated with silicon dioxide nanospheres was obtained after removal of the glass sheet. The polymer resin composite was immersed in hydrofluoric acid with a mass fraction of 4 wt. % to remove the silicon dioxide shell to obtain a polyacrylate double-inverse opal photonic crystal resin film.

S4. An ethanol solution with acrylamide dissolved therein (the mass fraction of acrylamide in the ethanol solution was 4%) was prepared with acrylamide, a crosslinking agent (N,N-methylene bisacrylamide), a photoinitiator (2-hydroxy-2-methyl-1-phenyl-1-acetone) and ethanol, in which the mass ratio of the acrylamide to the crosslinking agent was 1:10 and the photoinitiator was 10% by mass of the acrylamide. The ethanol solution with acrylamide dissolved therein was filled into the surface of the polyacrylate double-inverse opal photonic crystal resin film (porous thin-film) with an amount of 15 μL/cm$^2$, followed by photopolymerization under ultraviolet with a power of 1 kW for 4 minutes to form a polyacrylamide network structure so as to obtain a double-inverse opal photonic crystal resin film with water writing color of red.

Embodiment 2

Polystyrene colloidal nanospheres were synthesized by emulsion polymerization. 0.65 g of sodium dodecyl sulfate emulsifier and 900 mL of deionized water were added into a 2000 mL three-necked round-bottomed flask with a mechanical stirrer, and were heated in oil bath to 85° C. to emulsify them for 1 hour with stirring at 350 r/min, followed by adding 90 g of styrene monomer into the flask to further stir for 30 minutes. 1 g of potassium persulfate initiator dissolved in 5 g of deionized water was added into the flask to react for 5 hours. After completion of the reaction, a white polystyrene nanospheres emulsion (with a particle size of 185 nm, a PDI of 0.029 and a surface potential of −38.9 mV) was obtained.

Core-shell nanospheres of polystyrene coated with silicon dioxide were prepared by the modified Stöber method, i.e., by hydrolyzing vinyl triethoxylsilane in a polystyrene nanospheres emulsion, the polystyrene nanospheres were coated with a dense silicon dioxide shell layer on the surfaces. 30 mL of the polystyrene nanospheres emulsion was added into a 250 mL single-necked round-bottomed flask, 100 mL of deionized water and 15 mL of ammonia and a stir bar were added into the flask to uniformly disperse by ultrasonic. The flask was stirred at room temperature with a magnetic stirrer at 300 r/min, while 8 mL of vinyl triethoxysilane was dropwise added into the flask with a micro injection pump within 3 hours. After reaction for 18 hours, a dispersion liquid of core-shell nanospheres of polystyrene coated with silicon dioxide (with a particle size of 220 nm, a PDI of 0.035 and a surface potential was −43.1 mV) was obtained. The obtained nanospheres dispersion liquid was washed with absolute ethanol for 3 times, and was finally prepared into a 30 wt. % nanospheres concentrate with ethanol for standby.

Preparation flow of the chromogenic double-inverse opal photonic crystal resin film using water as ink is shown as FIG. 1, including the following steps:

S1. A nanospheres concentrate of polystyrene coated with silicon dioxide (a particle size of the core-shell nanosphere was 220 nm and a particle size of the internal polystyrene nanosphere of 185 nm) with a mass fraction of 30 wt. % was coated on a glass substrate (18 cm×22 cm) with a rod at room temperature. The coating amount of the nanospheres concentrate was 2.5 μL/cm². The nanospheres were self-assembled to obtain an opal photonic crystal template. The obtained opal photonic crystal template was placed in an oven at 90° C. for 1 hour.

S2. Polyimide tape was affixed at four corners of the opal photonic crystal template as a gasket and a glass sheet was covered thereon to form a gap with a width of 500 μm. Copolymer monomers of ethoxylated trimethylolpropane triacrylate, poly(ethylene glycol) (200) diacrylate and acrylic acid were mixed in a volume ratio of 1:4:0.75 followed by addition of a photoinitiator (2-hydroxy-2-methyl-1-phenyl-1-acetone (1173)), in which the volume ratio of the photoinitiator to the copolymer monomers was 0.04:1. After ultrasonic dispersion to mix evenly, the mixture was injected into the gap of the "sandwich" structure followed by photopolymerization under ultraviolet with a power of 1 kW for 40 seconds to obtain a flexible polyacrylate resin composite film.

S3. A polymer resin composite film containing polystyrene coated with silicon dioxide nanospheres was obtained after removal of the glass sheet. The polymer resin composite was immersed in hydrofluoric acid with a mass fraction of 3.5 wt. % to remove the silicon dioxide shell to obtain a polyacrylate double-inverse opal photonic crystal resin film.

S4. An ethanol solution with acrylamide dissolved therein (the mass fraction of acrylamide in the ethanol solution was 4%) was prepared with acrylamide, a crosslinking agent (N, N-methylene bisacrylamide), a photoinitiator (2-hydroxy-2-methyl-1-phenyl-1-acetone) and ethanol, in which the mass ratio of the acrylamide to the crosslinking agent was 1:9 and the photoinitiator was 10% by mass of the acrylamide. The ethanol solution with acrylamide dissolved therein was filled into the surface of the polyacrylate double-inverse opal photonic crystal resin film (porous thin-film) with an amount of 15 μL/cm², followed by photopolymerization under ultraviolet with a power of 1 kW for 4 minutes to form a polyacrylamide network structure so as to obtain a double-inverse opal photonic crystal resin film with water writing color of green.

Embodiment 3

Polystyrene colloidal nanospheres were synthesized by emulsion polymerization. 0.75 g of sodium dodecyl sulfate emulsifier and 900 mL of deionized water were added into a 2000 mL three-necked round-bottomed flask with a mechanical stirrer, and were heated in oil bath to 85° C. to emulsify them for 1 hour with stirring at 350 r/min, followed by adding 90 g of styrene monomer into the flask to further stir for 30 minutes. 1 g of potassium persulfate initiator dissolved in 5 g of deionized water was added into the flask to react for 5 hours. After completion of the reaction, a white polystyrene nanospheres emulsion (with a particle size of 170 nm, a PDI of 0.054 and a surface potential of −42.5 mV) was obtained.

Core-shell nanospheres of polystyrene coated with silicon dioxide were prepared by the modified Stöber method, i.e., by hydrolyzing vinyl triethoxylsilane in a polystyrene nanospheres emulsion, the polystyrene nanospheres were coated with a dense silicon dioxide shell layer on the surfaces. 30 mL of the polystyrene nanospheres emulsion was added into a 250 mL single-necked round-bottomed flask, 100 mL of deionized water and 15 mL of ammonia and a stir bar were added into the flask to uniformly disperse by ultrasonic. The flask was stirred at room temperature with a magnetic stirrer at 300 r/min, while 8 mL of vinyl triethoxysilane was dropwise added into the flask with a micro injection pump within 3 hours. After reaction for 18 hours, a dispersion liquid of core-shell nanospheres of polystyrene coated with silicon dioxide (with a particle size of 220 nm, a PDI of 0.035 and a surface potential of −43.1 mV) was obtained. The obtained nanospheres dispersion liquid was washed with absolute ethanol for 3 times, and was finally prepared into a 30 wt. % nanospheres concentrate with ethanol for standby.

Preparation flow of the chromogenic double-inverse opal photonic crystal resin film using water as ink is shown as FIG. 1, including the following steps:

S1. A nanospheres concentrate of polystyrene coated with silicon dioxide (a particle size of the core-shell nanosphere was 200 nm, and a particle size of the internal polystyrene nanosphere was 170 nm) with a mass fraction of 30 wt. % was coated on a glass substrate (18 cm×22 cm) with a rod at room temperature. The coating amount of the nanospheres concentrate was 2.5 μL/cm². The nanospheres were self-assembled to obtain an opal photonic crystal template. The obtained opal photonic crystal template was placed in an oven at 90° C. for 1 hour.

S2. Polyimide tape was affixed at four corners of the opal photonic crystal template as a gasket and a glass sheet was covered thereon to form a gap with a width of 500 μm. Copolymer monomers of ethoxylated trimethylolpropane triacrylate, poly(ethylene glycol) (200) diacrylate and acrylic acid were mixed in a volume ratio of 1:4:1 followed by addition of a photoinitiator (2-hydroxy-2-methyl-1-phenyl-1-acetone (1173)), in which the volume ratio of the photoinitiator to the copolymer monomers was 0.03:1. After ultrasonic dispersion to mix evenly, the mixture was injected into the gap of the "sandwich" structure followed by photopolymerization under ultraviolet with a power of 1 kW for 40 seconds to obtain a flexible polyacrylate resin composite film.

S3. A polymer resin composite film containing polystyrene coated with silicon dioxide nanospheres was obtained after removal of the glass sheet. The polymer resin composite was immersed in hydrofluoric acid with a mass fraction of 4 wt. % to remove the silicon dioxide shell to obtain a polyacrylate double-inverse opal photonic crystal resin film.

S4. An ethanol solution with acrylamide dissolved therein (the mass fraction of acrylamide in the ethanol solution was 3%) was prepared with acrylamide, a crosslinking agent (N, N-methylene bisacrylamide), a photoinitiator (2-hydroxy-2-methyl-1-phenyl-1-acetone) and ethanol, in which the mass ratio of the acrylamide to the crosslinking agent was 1:8 and the photoinitiator was 10% by mass of the acrylamide. The ethanol solution with acrylamide dissolved therein was filled into the surface of the polyacrylate double-inverse opal photonic crystal resin film (porous thin-film) with an amount of 15 μL/cm$^2$, followed by photopolymerization under ultraviolet with a power of 1 kW for 4 minutes to form polyacrylamide network structure so as to obtain the double-inverse opal photonic crystal resin film with water-writing color of green.

Embodiment 4

Polystyrene colloidal nanospheres were synthesized by emulsion polymerization. 0.55 g of sodium dodecyl sulfate emulsifier and 900 mL of deionized water were added into a 2000 mL three-necked round-bottomed flask with a mechanical stirrer, and were heated in oil bath to 85° C. to emulsify them for 1 hour with stirring at 350 r/min, followed by adding 90 g of styrene monomer into the flask to further stir for 30 minutes. 1 g of potassium persulfate initiator dissolved in 5 g of deionized water was added into the flask to react for 5 hours After completion of the reaction, a white polystyrene nanospheres emulsion (with a particle size of 255 nm, a PDI of 0.062 and a surface potential of −49.2 mV) was obtained.

Core-shell nanospheres of polystyrene coated with silicon dioxide were prepared by the modified Stöber method, i.e., by hydrolyzing vinyl triethoxylsilane in a polystyrene nanospheres emulsion, the polystyrene nanospheres were coated with a dense silicon dioxide shell layer on the surfaces. 30 mL of the polystyrene nanospheres emulsion was added into a 250 mL single-necked round-bottomed flask, 100 mL of deionized water and 15 mL of ammonia and a stir bar were added into the flask to uniformly disperse by ultrasonic. The flask was stirred at room temperature with a magnetic stirrer at 300 r/min, while 8 mL of vinyl triethoxysilane was dropwise added into the flask with a micro injection pump within 3 hours. After reaction for 18 hours. A dispersion liquid of core-shell nanospheres of polystyrene coated with silicon dioxide (with a particle size of 260 nm, a PDI of 0.022 and a surface potential of −49.6 mV) was obtained. The obtained nanospheres dispersion liquid was washed with absolute ethanol for 3 times, and was finally prepared into a 30 wt. % nanospheres concentrate with ethanol for standby.

Preparation flow of the chromogenic double-inverse opal photonic crystal resin film using water as ink is shown as FIG. 1, including the following steps:

S1. A nanospheres concentrate of polystyrene coated with silicon dioxide (a particle size of the core-shell nanosphere was 260 nm, and the particle size of the internal polystyrene nanosphere was 225 nm) with a mass fraction of 35 wt. % was coated on a glass substrate (18 cm×22 cm) with a rod at room temperature. The coating amount of the nanospheres concentrate was 2.5 μL/cm$^2$. The nanospheres were self-assembled to obtain an opal photonic crystal template. The obtained opal photonic crystal template was placed in an oven at 95° C. for 0.5 hour.

S2. Polyimide tape was affixed at four corners of the opal photonic crystal template as a gasket and a glass sheet was covered thereon to form a gap with a width of 600 μm. Copolymer monomers of ethoxylated trimethylolpropane triacrylate, poly(ethylene glycol) (250) diacrylate and acrylic acid were mixed in a volume ratio of 1:4:0.6 followed by addition of a photoinitiator (2-hydroxy-2-methyl-1-phenyl-1-acetone (1173)), in which the volume ratio of the photoinitiator to the copolymer monomer was 0.06:1. After ultrasonic dispersion to mix evenly, the mixture was injected into the gap of the "sandwich" structure followed by photopolymerization under ultraviolet with a power of 1 kW for 40 seconds to obtain a flexible polyacrylate resin composite film.

S3. A polymer resin composite film containing polystyrene coated with silicon dioxide nanospheres was obtained after removal of the glass sheet. The polymer resin composite was immersed in hydrofluoric acid with a mass fraction of 5 wt. % to remove the silicon dioxide shell to obtain a polyacrylate double-inverse opal photonic crystal resin film.

S4. An ethanol solution with acrylamide dissolved therein (the mass fraction of acrylamide in the ethanol solution was 4%) was prepared with acrylamide, a crosslinking agent (trimethylolpropane triacrylate), a photoinitiator (2-hydroxy-2-methyl-1-phenyl-1-acetone) and ethanol, in which the mass ratio of the acrylamide to the crosslinking agent was 1:6, and the photoinitiator was 10% by mass of the acrylamide. The ethanol solution with acrylamide dissolved therein was filled into the surface of the polyacrylate double-inverse opal photonic crystal resin film (porous thin-film) with an amount of 15 μL/cm$^2$, followed by photopolymerization under ultraviolet with a power of 1 kW for 3.5 minutes to form polyacrylamide network structure so as to obtain the double-inverse opal photonic crystal resin film with water-writing color of red.

Embodiment 5

Polystyrene colloidal nanospheres were synthesized by emulsion polymerization. 0.65 g of sodium dodecyl sulfate emulsifier and 900 mL of deionized water were added into a 2000 mL three-necked round-bottomed flask with a mechanical stirrer, and were heated in oil bath to 85° C. to emulsify them for 1 hour with stirring at 350 r/min, followed by adding 90 g of styrene monomer into the flask to further stir for 30 minutes. 1 g of potassium persulfate initiator dissolved in 5 g of deionized water was added into the flask to react for 5 hours. After completion of the reaction, a white polystyrene nanospheres emulsion (with a particle size of 185 nm, a PDI of 0.029 and a surface potential of −38.9 mV) was obtained.

Core-shell nanospheres of polystyrene coated with silicon dioxide were prepared by the modified Stöber method, i.e., by hydrolyzing vinyl triethoxylsilane in a polystyrene nanospheres emulsion, the polystyrene nanospheres were coated with a dense silicon dioxide shell layer on the surfaces. 30 mL of the polystyrene nanospheres emulsion was added into a 250 mL single-necked round-bottomed flask, 100 mL of deionized water and 15 mL of ammonia and a stir bar were added into the flask to uniformly disperse by ultrasonic. The flask was stirred at room temperature with a magnetic stirrer at 300 r/mi, while 8 mL of vinyl triethoxysilane was dropwise added into the flask with a micro injection pump within 3 hours. After reaction for 18 hours, a dispersion liquid of core-shell nanospheres of polystyrene coated with silicon dioxide (with a particle size of 220 nm, a PDI of 0.035 and a surface potential of −43.1 mV) was obtained. The obtained nanospheres dispersion liquid was washed with absolute ethanol for 3 times, and was finally prepared into a 32 wt. % nanospheres concentrate with ethanol for standby.

Preparation flow of the chromogenic double-inverse opal photonic crystal resin film using water as ink is shown as FIG. 1, including the following steps:

S1. A nanospheres concentrate of polystyrene coated with silicon dioxide (a particle size of the core-shell nanosphere was 220 nm, and a particle size of the internal polystyrene nanosphere was 185 nm) with a mass fraction of 32 wt. % was coated on a glass substrate (18 cm×22 cm) with a rod at room temperature. The coating amount of the nanospheres concentrate was 2.5 µL/cm². The nanospheres were self-assembled to obtain an opal photonic crystal template. The obtained opal photonic crystal template was placed in an oven at 80° C. for 2 hours.

S2. Polyimide tape was affixed at four corners of the opal photonic crystal template as a gasket and a glass sheet was covered thereon to form a gap with a width of 700 µm. Copolymer monomers of ethoxylated trimethylolpropane triacrylate, poly(ethylene glycol) (200) diacrylate and acrylic acid were mixed in a volume ratio of 1:4:0.9 followed by addition of a photoinitiator (2-hydroxy-2-methyl-1-phenyl-1-acetone (1173)), in which the volume ratio of the photoinitiator to the copolymer monomers was 0.05:1. After ultrasonic dispersion to mix evenly, the mixture was injected into the gap of the "sandwich" structure followed by photopolymerization under ultraviolet with a power of 1 kW for 45 seconds to obtain a flexible polyacrylate resin composite film.

S3. A polymer resin composite film containing polystyrene coated with silicon dioxide nanospheres was obtained after removal of the glass sheet. The polymer resin composite was immersed in hydrofluoric acid with a mass fraction of 5 wt. % to remove the silicon dioxide shell to obtain a polyacrylate double-inverse opal photonic crystal resin film.

S4. An ethanol solution with acrylamide dissolved therein (the mass fraction of acrylamide in the ethanol solution was 4%) was prepared with acrylamide, a crosslinking agent (N, N-methylene bisacrylamide), a photoinitiator (2-hydroxy-2-methyl-1-phenyl-1-acetone) and ethanol, in which the mass ratio of the acrylamide to the crosslinking agent was 1:11 and the photoinitiator was 10% by mass of the acrylamide. The ethanol solution with acrylamide dissolved therein was filled into the surface of the polyacrylate double-inverse opal photonic crystal resin film (porous thin-film) with an amount of 15 µL/cm², followed by photopolymerization under ultraviolet with a power of 1 kW for 5 minutes to form polyacrylamide network structure so as to obtain the double-inverse opal photonic crystal resin film with water-writing color of green.

Embodiment 6

Polystyrene colloidal nanospheres were synthesized by emulsion polymerization. 0.75 g of sodium dodecyl sulfate emulsifier and 900 mL of deionized water were added into a 2000 mL three-necked round-bottomed flask with a mechanical stirrer, and were heated in oil bath to 85° C. to emulsify them for 1 hour with stirring at 350 r/min, followed by adding 90 g of styrene monomer into the flask to further stir for 30 minutes. 1 g of potassium persulfate initiator dissolved in 5 g of deionized water was added into the flask to react for 5 hours. After completion of the reaction, a white polystyrene nanospheres emulsion (with a particle size of 170 nm, a PDI of 0.054 and a surface potential of −42.5 mV) was obtained.

Core-shell nanospheres of polystyrene coated with silicon dioxide were prepared by the modified Stöber method, i.e., by hydrolyzing vinyl triethoxylsilane in a polystyrene nanospheres emulsion, the polystyrene nanospheres were coated with a dense silicon dioxide shell layer on surfaces. 30 mL of the polystyrene nanospheres emulsion was added into a 250 mL single-necked round-bottomed flask, 100 mL of deionized water and 15 mL of ammonia and a stir bar were added into the flask to uniformly disperse by ultrasonic. The flask was stirred at room temperature with a magnetic stirrer at 300 r/min, while 8 mL of vinyl triethoxysilane was dropwise added into the flask with a micro injection pump within 3 hours. After reaction for 18 hours, a dispersion liquid of core-shell nanospheres of polystyrene coated with silicon dioxide (with a particle size of 220 nm, a PDI of 0.035 and a surface potential of −43.1 mV) was obtained. The obtained nanospheres dispersion liquid was washed with absolute ethanol for 3 times, and was finally prepared into a 33 wt. % nanospheres concentrate with ethanol for standby.

Preparation flow of the chromogenic double-inverse opal photonic crystal resin film using water as ink is shown as FIG. 1, including the following steps:

S1. A nanospheres concentrate of polystyrene coated with silicon dioxide (a particle size of the core-shell nanospheres was 200 nm, and a particle size of the internal polystyrene nanosphere was 170 nm) with a mass fraction of 33 wt. % was coated on a glass substrate (18 cm×22 cm) with a rod at room temperature. The coating amount of the nanospheres concentrate was 2.5 µL/cm². The nanospheres were self-assembled to obtain an opal photonic crystal template. The obtained opal photonic crystal template was placed in an oven at 88° C. for 1.2 hours.

S2. Polyimide tape was affixed at four corners of the opal photonic crystal template as a gasket and a glass sheet was covered thereon to form a gap with a width of 800 µm. Copolymer monomers of ethoxylated trimethylolpropane triacrylate, poly(ethylene glycol) (250) diacrylate and acrylic acid were mixed in a volume ratio of 1:4:1.2 followed by addition of a photoinitiator (2,2-dimethoxy-2-phenylacetophenone), in which the volume ratio of the photoinitiator to the copolymer monomer was 0.05:1. After ultrasonic dispersion to mix evenly, the mixture was injected into the gap of the "sandwich" structure followed by photopolymerization under ultraviolet with a power of 1.5 kW for 50 seconds to obtain a flexible polyacrylate resin composite film.

S3. A polymer resin composite film containing polystyrene coated with silicon dioxide nanospheres was obtained after removal of the glass sheet. The polymer resin composite was immersed in hydrofluoric acid with a mass fraction of 6 wt. % to remove the silicon dioxide shell to obtain a polyacrylate double-inverse opal photonic crystal resin film.

S4. An ethanol solution with acrylamide dissolved therein (the mass fraction of acrylamide in the ethanol solution was 3%) was prepared with acrylamide, a crosslinking agent (N,N-methylene bisacrylamide), a photoinitiator (2,2-dimethoxy-2-phenylacetophenone) and ethanol, in which the mass ratio of the acrylamide to the crosslinking agent was 1:11 and the photoinitiator was 12% by mass of the acrylamide. The ethanol solution with acrylamide dissolved therein was filled into the surface of the polyacrylate double-inverse opal photonic crystal resin film (porous thin-film) with an amount of 15 μL/cm$^2$, followed by photopolymerization under ultraviolet with a power of 1 kW for 6 minutes to form polyacrylamide network structure so as to obtain the double-inverse opal photonic crystal resin film with water-writing color of green.

Embodiment 7

Polystyrene colloidal nanospheres were synthesized by emulsion polymerization. 0.55 g of sodium dodecyl sulfate emulsifier and 900 mL of deionized water were added into a 2000 mL three-necked round-bottomed flask with a mechanical stirrer, and were heated in oil bath to 85° C. to emulsify them for 1 hour with stirring at 350 r/min, followed by adding 90 g of styrene monomer into the flask to further stir for 30 minutes. 1 g of potassium persulfate initiator dissolved in 5 g of deionized water was added into the flask to react for 5 hours. After completion of the reaction, a white polystyrene nanospheres emulsion (with a particle size of 225 nm, a PDI of 0.062 and a surface potential of −49.2 mV) was obtained.

Core-shell nanospheres of polystyrene coated with silicon dioxide were prepared by the modified Stöber method, i.e., by hydrolyzing vinyl triethoxylsilane in a polystyrene nanospheres emulsion, the polystyrene nanospheres were coated with a dense silicon dioxide shell layer on the surfaces. 30 mL of the polystyrene nanospheres emulsion was added into a 250 mL single-necked round-bottomed flask, 100 mL of deionized water and 15 mL of ammonia and a stir bar were added into the flask to uniformly disperse by ultrasonic. The flask was stirred at room temperature with a magnetic stirrer at 300 r/min, while 8 mL of vinyl triethoxysilane was dropwise added into the flask with a micro injection pump within 3 hours. After reaction for 18 hours, a disersion liquid of core-shell nanospheres of polystyrene coated with silicon dioxide (with a particle size of 260 nm, a PDI of 0.022 and a surface potential of −49.6 mV) was obtained. The obtained nanospheres dispersion liquid was washed with absolute ethanol for 3 times, and was finally prepared into a 33 wt. % nanospheres concentrate with ethanol for standby.

Preparation flow of the chromogenic double-inverse opal photonic crystal resin film using water as ink is shown as FIG. 1, including the following steps:

S1. A nanospheres concentrate of polystyrene coated with silicon dioxide (a particle size of the core-shell nanosphere was 260 nm, and a particle size of the internal polystyrene nanosphere was 225 nm) with a mass fraction of 33 wt. % was coated on a glass substrate (18 cm×22 cm) with a rod at room temperature. The coating amount of the nanospheres concentrate was 2.5 μL/cm$^2$. The nanospheres were self-assembled to obtain an opal photonic crystal template. The obtained opal photonic crystal template was placed in an oven at 92° C. for 0.8 hour.

S2. Polyimide tape was affixed at four corners of the opal photonic crystal template as a gasket and a glass sheet was covered thereon to form a gap with a width of 750 μm. Copolymer monomers of ethoxylated trimethylolpropane triacrylate, poly(ethylene glycol) (200) diacrylate and acrylic acid were mixed in a volume ratio of 1:4:1.5 followed by addition of a photoinitiator (2-hydroxy-2-methyl-1-phenyl-1-acetone (1173)), in which the volume ratio of the photoinitiator to the copolymer monomer was 0.03:1. After ultrasonic dispersion to mix evenly, the mixture was injected into the gap of the "sandwich" structure followed by photopolymerization under ultraviolet with a power of 1 kW for 50 seconds to obtain a flexible polyacrylate resin composite film.

S3. A polymer resin composite film containing polystyrene coated with silicon dioxide nanospheres was obtained after removal of the glass sheet. The polymer resin composite was immersed in hydrofluoric acid with a mass fraction of 5 wt. % to remove the silicon dioxide shell to obtain a polyacrylate double-inverse opal photonic crystal resin film.

S4. An ethanol solution with acrylamide dissolved therein (the mass fraction of acrylamide in the ethanol solution was 4%) was prepared with acrylamide, a crosslinking agent (trimethylolpropane triacrylate), a photoinitiator (2-hydroxy-2-methyl-1-phenyl-1-acetone) and ethanol, in which the mass ratio of the acrylamide to the crosslinking agent was 1:8 and the photoinitiator was 10% by mass of the acrylamide. The ethanol solution with acrylamide dissolved therein was filled into the surface of the polyacrylate double-inverse opal photonic crystal resin film (porous thin-film) with an amount of 15 μL/cm$^2$, followed by photopolymerization under ultraviolet with a power of 1 kW for 8 minutes to form polyacrylamide network structure so as to obtain the double-inverse opal photonic crystal resin film with water-writing color of red.

Embodiment 8

Polystyrene colloidal nanospheres were synthesized by emulsion polymerization. 0.65 g of sodium dodecyl sulfate emulsifier and 900 mL of deionized water were added into a 2000 mL three-necked round-bottomed flask with a mechanical stirrer, and were heated in oil bath to 85° C. to emulsify them for 1 hour with stirring at 350 r/min, followed by adding 90 g of styrene monomer into the flask to further stir for 30 minutes. 1 g of potassium persulfate initiator dissolved in 5 g of deionized water was added into the flask to react for 5 hours. After completion of the reaction, a white polystyrene nanospheres emulsion (with a particle size of 185 nm, a PDI of 0.029 and a surface potential of −38.9 mV) was obtained.

Core-shell nanospheres of polystyrene coated with silicon dioxide were prepared by the modified Stöber method, i.e., by hydrolyzing vinyl triethoxylsilane in a polystyrene nanospheres emulsion, the polystyrene nanospheres were coated with a dense silicon dioxide shell layer on the surfaces. 30 mL of the polystyrene nanospheres emulsion was added into a 250 mL single-necked round-bottomed flask, 100 mL of deionized water and 15 mL of ammonia and a stir bar were added into the flask to uniformly dispersed by ultrasonic. The flask was stirred at room temperature with a magnetic stirrer at 300 r/min, while 8 mL of vinyl triethoxysilane was dropwise added into the flask with a micro injection pump within 3 hours. After reaction for 18 hours. a dispersion liquid of core-shell nanospheres of polystyrene coated with silicon dioxide (with a particle size of 220 nm, a PDI of 0.035 and a surface potential of −43.1 mV) was obtained.

The obtained nanospheres dispersion liquid was washed with absolute ethanol for 3 times, and was finally prepared into a 32 wt. % nanospheres concentrate with ethanol for standby.

Preparation flow of the chromogenic double-inverse opal photonic crystal resin film using water as ink is shown as FIG. 1, including the following steps:

S1. A nanospheres concentrate of polystyrene coated with silicon dioxide (a particle size of the core-shell nanosphere was 220 nm, and a particle size of the internal polystyrene nanosphere was 185 nm) with a mass fraction of 32 wt. % was coated on a glass substrate (18 cm×22 cm) with a rod at room temperature. The coating amount of the nanospheres concentrate was 2.5 μL/cm². The nanospheres were self-assembled to obtain an opal photonic crystal template. The obtained opal photonic crystal template was placed in an oven at 80° C. for 2 hours.

S2. Polyimide tape was affixed at four corners of the opal photonic crystal template as a gasket and a glass sheet was covered thereon to form a gap with a width of 850 μm. Copolymer monomers of ethoxylated trimethylolpropane triacrylate, poly(ethylene glycol) (250) diacrylate and acrylic acid were mixed in a volume ratio of 1:4:0.9 followed by addition of a photoinitiator (2,2-dimethoxy-2-phenylacetophenone), in which the volume ratio of the photoinitiator to the copolymer monomers was 0.06:1. After ultrasonic dispersion to and mix evenly, the mixture was injected into the gap of the "sandwich" structure followed by photopolymerization under ultraviolet with a power of 1 kW for 50 seconds to obtain a flexible polyacrylate resin composite film.

S3. A polymer resin composite film containing polystyrene coated with silicon dioxide nanospheres was obtained after removal of the glass sheet. The polymer resin composite was immersed in hydrofluoric acid with a mass fraction of 5 wt. % to remove the silicon dioxide shell to obtain a polyacrylate double-inverse opal photonic crystal resin film.

S4. An ethanol solution with acrylamide dissolved therein (the mass fraction of acrylamide in the ethanol solution was 4%) was prepared with acrylamide, a crosslinking agent (trimethylolpropane triacrylate), a photoinitiator (2-hydroxy-2-methyl-1-phenyl-1-acetone) and ethanol, in which the mass ratio of the acrylamide to the crosslinking agent was 1:11 and the photoinitiator was 10% by mass of acrylamide. The ethanol solution with acrylamide dissolved therein was filled into the surface of the polyacrylate double-inverse opal photonic crystal resin film (porous thin-film) with an amount of 15 μL/cm², followed by photopolymerization under ultraviolet with a power of 1 kW for 5 minutes to form polyacrylamide network structure so as to obtain the double-inverse opal photonic crystal resin film with water-writing color of green.

Embodiment 9

Polystyrene colloidal nanospheres were synthesized by emulsion polymerization. 0.75 g of sodium dodecyl sulfate emulsifier and 900 mL of deionized water were added into a 2000 mL three-necked round-bottomed flask with a mechanical stirrer, and were heated in oil bath to 85° C. to emulsify them for 1 hour with stirring at 350 r/min, followed by adding 90 g of styrene monomer into the flask to further stir for 30 minutes. 1 g of potassium persulfate initiator dissolved in 5 g of deionized water was added into the flask to react for 5 hours. After completion of the reaction, a white polystyrene microsphere emulsion (with a particle size of 170 nm, a PDI of 0.054 and a surface potential of −42.5 mV) was obtained.

Core-shell nanospheres of polystyrene coated with silicon dioxide were prepared by the modified Stöber method, i.e., by hydrolyzing vinyl triethoxylsilane in a polystyrene nanospheres emulsion, the polystyrene nanospheres were coated with a dense silicon dioxide shell layer on the surfaces. 30 mL of the polystyrene nanospheres emulsion was added into a 250 mL single-necked round-bottomed flask, 100 mL of deionized water and 15 mL of ammonia and a stir bar were added into the flask to uniformly disperse by ultrasonic. The flask was stirred at room temperature with a magnetic stirrer at 300 r/min, while 8 mL of vinyl triethoxysilane was dropwise added into the flask with a micro injection pump within 3 hours. After completion of the reaction, a dispersion liquid of core-shell nanospheres of polystyrene coated with silicon dioxide (with a particle size of 220 nm, a PDI of 0.035 and a surface potential of −43.1 mV) was obtained. The obtained nanospheres dispersion liquid was washed with absolute ethanol for 3 times, and was finally prepared into a 36 wt. % nanosphere concentrate with ethanol for standby.

Preparation flow of the chromogenic double-inverse opal photonic crystal resin film using water as ink is shown as FIG. 1, including the following steps:

S1. A nanospheres concentrate of polystyrene coated with silicon dioxide (a particle size of the core-shell nanosphere was 200 nm, and a particle size of the internal polystyrene microsphere was 170 nm) with a mass fraction of 36 wt. % was coated on a glass substrate (18 cm×22 cm) with a rod at room temperature. The coating amount of the nanospheres concentrate was 2.5 μL/cm². The nanospheres were self-assembled to obtain an opal photonic crystal template. The obtained opal photonic crystal template was placed in an oven at 85° C. for 1.5 hours.

S2. Polyimide tape was pasted at four corners of the opal photonic crystal template as a gasket and a glass sheet was covered thereon to form a gap with a width of 900 μm. Copolymer monomers of ethoxylated trimethylolpropane triacrylate, poly(ethylene glycol) (200) diacrylate and acrylic acid were mixed in a volume ratio of 1:4:2 followed by addition of a photoinitiator (2,2-dimethoxy-2-phenylacetophenone). The volume ratio of the photoinitiator to the copolymer monomer was 0.06:1. After ultrasonic dispersion to mix evenly, the mixture was injected into the gap of the "sandwich" structure followed by photopolymerization under ultraviolet with a power of 1.5 kW for 50 seconds to obtain a flexible polyacrylate resin composite film.

S3. A polymer resin composite film containing polystyrene coated with silicon dioxide nanospheres was obtained after removal of the glass sheet. The polymer resin composite was immersed in hydrofluoric acid with a mass fraction of 7 wt. % to remove the silicon dioxide shell to obtain a polyacrylate double-inverse opal photonic crystal resin film.

S4. An ethanol solution with acrylamide dissolved therein (the mass fraction of acrylamide in the ethanol solution was 3%) was prepared with acrylamide, a crosslinking agent (N,N-methylene bisacrylamide), a photoinitiator (2,2-dimethoxy-2-phenylacetophenone) and ethanol, in which the mass ratio of the acrylamide to the crosslinking agent was 1:9, and the photoinitiator was 8% by mass of the acrylamide. The ethanol solution with acrylamide dissolved therein was filled into the surface of the polyacrylate double-inverse opal photonic crystal resin film (porous thin-film) with an amount of 15 µL/cm², followed by photopolymerization under ultraviolet with a power of 1 kW for 8 minutes to form polyacrylamide network structure so as to obtain the double-inverse opal photonic crystal resin film with water-writing color of blue.

Embodiment 10

Polystyrene colloidal nanospheres were synthesized by emulsion polymerization. 0.55 g of sodium dodecyl sulfate emulsifier and 900 mL of deionized water were added into a 2000 mL three-necked round-bottomed flask with a mechanical stirrer, and were heated in oil bath to 85° C. to carry out emulsification for 1 hour with stirring at 350 r/min, followed by adding 90 g of styrene monomer into the flask to further stir for 30 minutes. 1 g of potassium persulfate initiator dissolved in 5 g of deionized water was added into the flask to react for 5 hours. After completion of the reaction, a white polystyrene nanospheres emulsion (with a particle size of 225 nm, a PDI of 0.062 and a surface potential of −49.2 mV) was obtained.

Core-shell nanospheres of polystyrene coated with silicon dioxide were prepared by the modified Stöber method, i.e., by hydrolyzing vinyl triethoxylsilane in a polystyrene microspheres emulsion, the polystyrene nanospheres were coated with a dense silicon dioxide shell layer on the surfaces. 30 mL of the above polystyrene nanospheres emulsion was added into a 250 mL single-necked round-bottomed flask, 100 mL of deionized water and 15 mL of ammonia and a stir bar were added into the flask to uniformly disperse by ultrasonic. The flask was stirred at room temperature with a magnetic stirrer at 300 r/min, while 8 mL of vinyl triethoxysilane was dropwise added into the flask with a micro injection pump within 3 hours. After reaction for 18 hours, a dispersion liquid of core-shell nanospheres of polystyrene coated with silicon dioxide (with a particle size of 260 nm, a PDI of 0.022 and a surface potential of −49.6 mV) was obtained. The obtained nanospheres dispersion liquid was washed with absolute ethanol for 3 times, and was finally prepared into a 35 wt. % nanosphere concentrate with ethanol for standby.

Preparation flow of the chromogenic double-inverse opal photonic crystal resin film using water as ink is shown as FIG. 1, including the following steps:

S1. A nanospheres concentrate of polystyrene coated with silicon dioxide (a particle size of the core-shell nanosphere was 260 nm, and a particle size of the internal polystyrene microsphere was 225 nm) with a mass fraction of 35 wt. % was coated on a glass substrate (18 cm×22 cm) with a rod at room temperature. The coating amount of the nanospheres concentrate was 2.5 µL/cm². The nanospheres were self-assembled to obtain an opal photonic crystal template. The obtained opal photonic crystal template was placed in an oven at 90° C. for 1 hour.

S2. Polyimide tape was affixed at four corners of the opal photonic crystal template as a gasket and a glass sheet was covered thereon to form a gap with a width of 500 µm. Copolymer monomers of ethoxylated trimethylolpropane triacrylate, poly(ethylene glycol) (250) diacrylate and acrylic acid were mixed in a volume ratio of 1:4:1.5 followed by addition of a photoinitiator (2-hydroxy-2-methyl-1-phenyl-1-acetone (1173)). The volume ratio of the photoinitiator to the copolymer monomer was 0.02:1. After ultrasonic dispersion to mix evenly, the mixture was injected into the gap of the "sandwich" structure followed by photopolymerization under ultraviolet with a power of 1 kW for 45 seconds to obtain a flexible polyacrylate resin composite film.

S3. A polymer resin composite film containing polystyrene coated with silicon dioxide nanospheres was obtained after removal of the glass sheet. The polymer resin composite was immersed in hydrofluoric acid with a mass fraction of 4 wt. % to remove the silicon dioxide shell to obtain a polyacrylate double-inverse opal photonic crystal resin film was obtained.

S4. An ethanol solution with acrylamide dissolved therein (the mass fraction of acrylamide in the ethanol solution was 4%) was prepared with acrylamide, a crosslinking agent (N,N-methylene bisacrylamide), a photoinitiator (2-hydroxy-2-methyl-1-phenyl-1-acetone) and ethanol, in which the mass ratio of the acrylamide to the crosslinking agent was 1:8, and the photoinitiator was 10% by mass of the acrylamide. The ethanol solution with acrylamide dissolved therein was filled into the surface of the polyacrylate double-inverse opal photonic crystal resin film (porous thin-film) with an amount of 15 µL/cm², followed by photopolymerization under ultraviolet with a power of 1 kW for 5 minutes to form polyacrylamide network structure so as to obtain the double-inverse opal photonic crystal resin film with water-writing color of red.

For those skilled in the art, without departing from the scope of the technical solution of the present disclosure, many possible changes and modifications can be made to the technical solution of the present disclosure by using the technical contents disclosed above, or modified into equivalent embodiments with equivalent changes. Therefore, any simple modification, equivalent change and modification made to the above embodiments according to the technical essence of the present disclosure without departing from the technical solution of the present disclosure shall still belong to the protection scope of the technical solution of the present disclosure.

The invention claimed is:

1. A chromogenic double-inverse opal photonic crystal resin film using water as ink, comprising a polyacrylamide or polydiacetone acrylamide network structure, wherein the network structure is formed by embedding nanospheres in pores of a polyacrylate inverse opal framework material to obtain a double-inverse opal photonic crystal resin film and then filling the pores of the double-inverse opal photonic crystal resin film with an ethanol solution with hydrophilic acrylamide or diacetone acrylamide dissolved therein followed by photopolymerization,
wherein
a mass fraction of hydrophilic acrylamide or diacetone acrylamide in the ethanol solution is 2 to 8 wt. %, and
the nanosphere are selected from polystyrene, polymethylmethacrylate, poly(styrene-methyl methacrylate-acrylic acid), titanium dioxide, cadmium sulfide, zinc oxide, and zinc sulfide.

2. The chromogenic double-inverse opal photonic crystal resin film using water as ink according to claim 1, wherein a particle size of the nanospheres ranges from 165 to 230 nm, and an aperture of the polyacrylate inverse opal framework material ranges from 185 to 280 nm.

3. The chromogenic double-inverse opal photonic crystal resin film using water as ink according to claim 2, wherein a particle size distribution of the nanospheres ranges from 0.02 to 0.07 and a surface potential ranges from −50 to −35 mV.

4. The chromogenic double-inverse opal photonic crystal resin film using water as ink according to claim 2, wherein the polyacrylate inverse opal framework material is formed by photopolymerization of triacrylates, diacrylates and acrylic acid as monomer components, wherein a volume ratio of triacrylates, diacrylates and acrylic acid is 1:4:0.5 to 1:4:2.

5. The chromogenic double-inverse opal photonic crystal resin film using water as ink according to claim 4, wherein the tricrylates is ethoxylated trimethylolpropane triacrylate, and the diacrylates is poly(ethylene glycol) diacrylates.

6. A method for preparing the chromogenic double-inverse opal photonic crystal resin film using water as ink according to claim 1, comprising the following steps of:
 S1: coating a core-shell nanosphere concentrate with a mass fraction of 20 to 40 wt. % on a glass or stainless-steel substrate, wherein the nanospheres self-assemble to form an opal photonic crystal template; and placing the opal photonic crystal template in an oven at 80 to 95° C. for 0.5 to 2 hours;
 S2: affixing polyimide tape at four corners of the opal photonic crystal template as gaskets, and covering a glass sheet thereon to form a gap with a width ranging from 500 to 1000 μm; filling the gap with a mixture liquor of triacrylates, diacrylates, acrylic acid and photoinitiator to conduct a photopolymerization under ultraviolet with a power of 0.5 to 2 kW for 30 to 60 seconds to obtain a polyacrylate resin composite film;
 S3: etching the shell of the polyacrylate resin composite film by hydrofluoric acid with a mass fraction of 1 to 10 wt. % to obtain a polyacrylate double-inverse opal photonic crystal resin film; and
 S4: filling a surface of the polyacrylate double-inverse opal photonic crystal resin film with the ethanol solution with hydrophilic acrylamide or diacetone acrylamide dissolved therein to conduct a photopolymerization under ultraviolet with a power of 0.5 to 2 kW for 3 to 20 minutes to obtain the chromogenic double-inverse opal photonic crystal resin film using water as ink, wherein, the ethanol solution with hydrophilic acrylamide or diacetone acrylamide dissolved therein is prepared from hydrophilic acrylamide or diacetone acrylamide, a cross-linking agent, a photoinitiator and ethanol, and a mass fraction of hydrophilic acrylamide or diacetone acrylamide in the ethanol B solution is 2 to 8 wt. %.

7. The chromogenic double-inverse opal photonic crystal resin film using water as ink according to claim 6, wherein the core-shell nanosphere is selected from one of polystyrene coated with silicon dioxide, polymethylmethacrylate coated with silicon dioxide, poly (styrene-methyl methacrylate-acrylic acid) coated with silicon dioxide, titanium dioxide coated with silicon dioxide, cadmium sulfide coated with silicon dioxide, zinc oxide coated with silicon dioxide, and zinc sulfide coated with silicon dioxide.

8. The chromogenic double-inverse opal photonic crystal resin film using water as ink according to claim 7, wherein for the core-shell nanosphere, a particle size is 165 to 230 nm, a PDI for particle size distribution is 0.02 to 0.06, and a surface potential is −45 to −50 mV.

9. The chromogenic double-inverse opal photonic crystal resin film using water as ink according to claim 6, wherein the cross-linking agent is N,N-methylenebisacrylamide or trimethylolpropane triacrylate, and the photoinitiator is 2,2-dimethoxy-2-phenylacetophenone or 2-hydroxy-2-methyl-1-phenyl-1-acetone.

10. The chromogenic double-inverse opal photonic crystal resin film using water as ink according to claim 6, wherein
 in step S1, a coating amount of the core-shell nanosphere concentrate is 2.0 to 3.0 μL/cm$^2$, and the core-shell nanosphere concentrate is prepared with ethanol;
 in step S2, an amount of the photoinitiator accounts for 1 to 6% of a total volume of the triacrylates, diacrylates and acrylic acid; and
 in step S4, a mass ratio of acrylamide or diacetone acrylamide to the crosslinking agent is 1:5 to 15, an amount of the photoinitiator is 5 to 15% by mass of the acrylamide or diacetone acrylamide, and a filling amount of the ethanol solution with hydrophilic acrylamide or diacetone acrylamide dissolved therein is 10-20 μL/cm$^2$.

* * * * *